Nov. 18, 1969  R. G. BRENT  3,478,777
VALVE

Filed May 12, 1967  2 Sheets-Sheet 1

INVENTOR.
ROBERT G. BRENT
BY
Kenyon & Kenyon
ATTORNEYS

INVENTOR.
ROBERT G. BRENT
BY Kenyon & Kenyon
ATTORNEYS

United States Patent Office 3,478,777
Patented Nov. 18, 1969

3,478,777
VALVE
Robert G. Brent, Arlington, Tex., assignor to Bell Aerospace Corporation, Wheatfield, N.Y., a corporation of Delaware
Filed May 12, 1967, Ser. No. 637,949
Int. Cl. F15b 21/04
U.S. Cl. 137—492.5        7 Claims

ABSTRACT OF THE DISCLOSURE

The embodiment of this invention disclosed in the following specification involves a two stage valve arrangement with internal communication between the two stages. A first stage is a flow control stage in which a spring biased first spool is positioned to affect the size of the restriction through this first stage and thereby affect the pressure drop and flow rate through the first stage. The second stage is a pressure responsive stage which includes a spring biased second spool that when properly balanced by the pressure to be controlled has a position that blocks communication from the second stage to the first stage. When unbalanced by a change in line pressure, the second spool moves in one direction or the other to provide communication between a chamber at one end of the first spool and one of two fluid lines coupled to the second stage. As a consequence, a small charge of fluid either flows into or out of the chamber to move the first spool and thus change the amount of restriction (that is, hydraulic resistance) in the flow control stage. This change in hydraulic resistance in the first stage results in a change in the flow characteristics of the system which brings the pressure that is being controlled back to the control point. When the pressure has been brought back to the desired controlled pressure, the second spool is repositioned to block communication between the two stages and thus stabilize the first spool at a position which maintains the desired pressure.

This invention relates in general to a valve design which provides a very accurate control over the pressure in a hydraulic system. More particularly, the valve of this invention will respond to very small changes or pressure thereby enabling the valve of this invention to be employed in such a fashion as to accurately maintain a pressure at a particular point in a hydraulic system.

There are known pressure responsive valves employed in regulating pressure in hydraulic systems. Certain known pressure responsive valves have employed a multi-stage arrangement wherein the pressure of liquid flowing through a first stage has been relied on as a reference pressure to position a second stage. The second stage, in turn, has determined the pressure in the first stage either (1) by cutting down on the flow of liquid out of the first stage to increase the pressure, or (2) by drawing off a portion of the flow of liquid in the first stage through suitable outlets to decrease the pressure. Still other valves have used a fluid by-pass arrangement which has drawn off a portion of the liquid from an upstream line to regulate a spring biased assembly to reduce or increase the flow of liquid through a throttle section so as to affect the pressure of the liquid in a downstream line.

However, the known valves have not been capable of very accurately controlling the pressure of the liquids flowing through the hydraulic lines of a fluid system. Thus, these valves have caused the design of hydraulic fluid systems to be complex and have created a maintenance problem in the field, especially where the valves have been used in aircraft.

Accordingly, it is a broad, major object of this invention to provide a constant pressure valve for accurately controlling a predetermined pressure in a hydraulic line of a fluid system.

It is another object of this invention to provide a constant pressure valve which is versatile in use and can be used within a fluid system as a pressure gage, a differential pressure control or a simple pressure control.

It is a more specific object of this invention to provide a constant pressure valve having a pressure control stage which is not subjected to a continuous flow of liquid medium.

It is another object of this invention to provide a constant pressure valve to maintain a constant predetermined pressure in a hydraulic line as the rate of fluid flow varies.

Generally, this invention provides a constant pressure valve which is connected across a hydraulic line of a fluid system for maintaining a predetermined pressure in the hydraulic line. The valve operates in response to the pressure of the fluid upstream of the valve so as to regulate the division of the flow of fluid between the valve and the line. This permits the valve to maintain a constant pressure in the line by increasing or decreasing the fluid flow directed from the hydraulic line through the valve.

The valve includes a fluid flow control assembly for controlling the flow of fluid and a pressure regulation assembly for regulating the fluid flow control assembly in response to the pressure of the fluid upstream of the valve whereby a constant pressure is maintained in the hydraulic line upstream of the valve.

The fluid flow control assembly includes a spring biased first spool whose position affects the cross sectional area of the fluid flow passage in the valve. This spring biased first spool operates in response to the pressure regulation assembly.

The pressure regulation assembly includes a second spool which is spring biased in opposition to the fluid pressure upstream of the valve. The second spool has an annular land which is precisely sized to the dimensions of a port leading to a chamber at one end of the first spool. The direction of pressure change, from the predetermined pressure at which the fluid upstream of the piston is being controlled, determines the direction in which the land moves relative to the port either to introduce fluid into the chamber adjacent the first spool or to allow fluid within the chamber to flow out of the valve. When the pressure tends to exceed the predetermined pressure, fluid flows into the chamber and the first spool (in the fluid flow control assembly) advances to enlarge the cross sectional area of the fluid flow path. This allows a greater flow of fluid through the valve and keeps the pressure of the fluid in the system down to the predetermined pressure. Should the pressure tend to drop below the predetermined pressure, some of the fluid in the chamber flows out and the first spool retracts to reduce the cross sectional area of the fluid flow path. This reduces the flow of fluid through the valve thereby keeping the fluid pressure in the system at the predetermined pressure.

The pressure regulation assembly is such that the land on the second spool therein is not subjected either to a continuous or to a large flow of fluid, thereby avoiding frictional wear forces. In addition, this absence of fluid flow in the pressure regulation assembly makes it possible to have that assembly be substantially immediately responsive to changes in the pressure of the fluid upstream of the valve.

The pressure regulation assembly can be connected between the hydraulic line upstream of the fluid flow control assembly and a reservoir. However, the valve may also be used as a differential valve in the same fluid system.

The valve is initially installed in the fluid system and set so as to maintain a predetermined constant pressure in a hydraulic line notwithstanding the amount of fluid flow therethrough. Should the pressure tend to increase in this line, the pressure regulation assembly is substantially immediately activated to cause the fluid flow control assembly to permit greater flow of fluid through the valve so as to lower the pressure in the hydraulic line to the predetermined constant pressure. Conversely, should the line pressure tend to decrease, the pressure regulation assembly causes the fluid control assembly to reduce the flow of fluid through the valve so as to increase the pressure in the hydraulic line to the predetermined pressure.

Other objects and purposes of this invention will become apparent from the following detailed description and drawings in which:

FIG. 1 illustrates a specific embodiment of the valve of this invention. In order to comprehend the operation of this valve, its structural features have to first be understood.

Figures 1, 2:
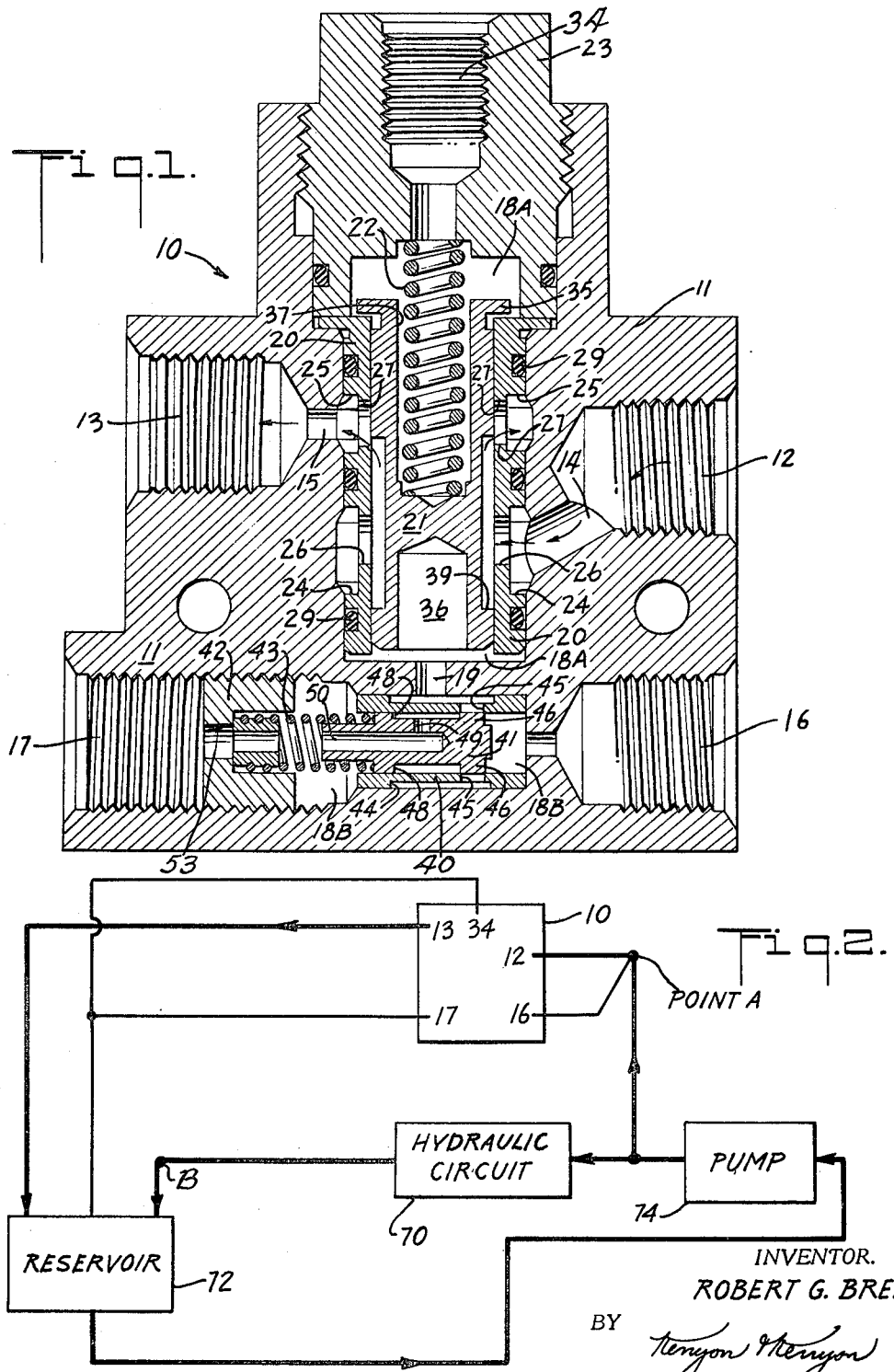
FIG. 1 is a cross sectional view of an embodiment of the constant pressure valve of this invention.
FIG. 2 is a schematic of a hydraulic system in which the FIG. 1 valve is employed to regulate the pressure at point A in the system.

As a first approach to the structural features of the valve 10, the upper portion of FIG. 1 may be referred to as the fluid flow control assembly and the lower portion of the FIG. 1 design may be referred to as the pressure regulation assembly. These two assemblies are shown within the same housing 11 but, of course, they may be constituted in separate housings with the provision that there must be one hydraulic line between these two assemblies; which hydraulic line is represented by the port 19 in FIG. 1.

The main fluid inlet port 12 and main fluid outlet port 13 may or may not be in communication with one another depending upon the particular state of the hydraulic system within which this hydraulic system is used. However, when fluid is flowing through the valve 10 it flows into port 12, through the valve, and out port 13. By contrast, the pressure regulation assembly ports 16 and 17 are not incommunication with one another and there is normally no fluid flow through either port 16 or 17. As will be described further on, if system pressure goes too high, a small amount of fluid may flow into the port 16, through the pressure regulation assembly, out the port 19 and into the fluid flow regulation assembly so as to appropriately adjust the fluid flow control assembly. Similarly, if system pressure drops too low, a small amount of fluid may flow from the chamber 36 in the fluid flow control assembly portion of the valve 10, out the port 19, through the pressure regulation assembly portion and out the port 17. In any case, there is no direct fluid flow from port 16 to port 17. In either case the amount of fluid flow into port 16 or out of port 17 is relatively slight.

FLUID FLOW CONTROL ASSEMBLY

The fluid flow control assembly functions to control the fluid flow through the valve 10, which flow is normally from port 12 to port 13. Each of the main ports 12, 13 communicates with a central chamber 18A within the housing 11 through suitable openings 14, 15 so that fluid can pass through the housing from the inlet port 12 to the outlet port 13.

The fluid flow control assembly includes an annular sleeve 20 at the walls of the central chamber 18A of the housing, a first spool 21 slidably mounted within the annular sleeve 20, and a compression spring 22 mounted in the housing against an end plug 23 to spring bias the spool 21 toward the downward (closed) position.

The annular sleeve 20 is formed with a pair of annular exterior recesses 24, 25 which are respectively disposed over the openings 14, 15 of the housing 11. Further, ports 26 and ports 27 in the sleeve 20 provide communication between the respective recesses 24, 25 and the interior of the sleeve 20. The annular sleeve 20 also has a plurality of longitudinally spaced exterior annular grooves in which O-rings 29 are positioned so as to seal the sleeve 20 with respect to the walls of the central chamber 18A.

The port 34 in the end plug 23 serves as a fluid vent and prevents hydraulically locking the spool 21.

The spool 21 is slidably mounted within the sleeve 20 between the top port 34 and the lower aperture 19. A flange 35 at the upper end of the spool 21 operates as a stop to limit spool 21 excursion. The spool 21 is counterbored at both ends to provide a lower chamber 36 and an upper chamber 37. An annular exterior groove 39 in the spool 21 extends across the ports 26 and across at least a portion of the ports 27 to permit fluid flow from inlet port 12 to outlet port 13.

The compression spring 22 is disposed within the upper chamber 37 of the spool 21 in alignment with the port 34 and exerts a downward force on the spool 21.

PRESSURE REGULATION ASSEMBLY

The pressure regulation assembly includes: (a) an annular sleeve 40 mounted in the chamber 18B between the secondary ports 16 and 17, (b) spool 41 slidably mounted within the sleeve 40, (c) an adjustable plug 42 at the outlet port 17, and (d) a compression spring 43 positioned between the spool 41 and plug 42.

An annular external recess 44 in the sleeve 40 provides communication between the aperture 19 (that leads to the central chamber 18A) and ports 45 (which lead to the chamber 18B). The spool 41 has an annular external groove 48 and a port 49 which places the groove 48 in communication with an interior chamber 50 within the spool 41. The land 46 on the spool 41 has an axial length equal to the diameter of the ports 45 so that the land 46 will seal off the ports 45 at only precise position of the spool 41. Movement of the spool 41 in either direction will uncover a portion of the ports 45.

The spool 41 is biased to the right in FIG. 1 by the spring 43 so that, absent an appropriate unbalanced pressure between the ports 16 and 17, the spool 41 will be in a position that places the chamber 36 in communication with the port 17 by virtue of a passageway from the chamber 36 through the port 19, the annular recess 44, the port 46, the annular groove 48, the port 49, the chamber 50, and finally the opening 53 in the end plug 42. However, as will be described further on, when in a stable operating condition, the land 46 will exactly overlay the ports 45 so that communication between the lower chamber 36 under the flow control spool 21 is cut off from either port 17 or port 16.

The end plug 42 is made adjustable, as by threading, within the port 17 so as to permit adjusting the extent of spring 43 axial pressure on the spool 41. In this fashion, by setting the adjustable plug 42, the pressure at which the valve 10 operates is set.

OPERATION

When the valve 10 is in a rest position, meaning that there are no hydraulic forces applied to any of the ports (for example, when on the shelf), then the spring 22 bias causes the flange 35 of the fluid flow control spool 21 to rest on the top end of the sleeve 20. In this position, the spool 21 is entirely retracted and the ports 27 are blocked by the spool 21 to render the valve 10 closed. Also, when the valve 10 is in a rest condition, the spring 43 bias causes the spool 41 of the pressure regulation assembly to be moved to the right so that the land 46 is to the right of the port 45 and communication is established between the chamber 36 and the port 17.

In at least one operating mode, the valve 10 when connected into a hydraulic line can be considered to be connected across a hydraulic circuit with the ports 12 and 16 connected into the hydraulic line immediately upstream of the hydraulic circuit and the ports 13, 17 and 34 connected to zero gage pressure which might conveniently be the hydraulic reservoir. Under these conditions the pressure at ports 12 and 16 is the same. The spring 43 is adjusted so that when the pressure at port 16 exactly equals the pressure at which it is desired to control the point in the line to which the port 16 is connected, then the land 46 will exactly overlie the port 45 to block off communication between the port 45 and either ports 16 or 17.

When the valve 10 is placed into a hydraulic system the valve has to be, as is normal in such circumstances, properly bled so that the various ports 12, 13, 16, 17 and 34 are filled with fluid as well as so that the chambers 18A and 18B (and in particular the chamber 36) is filled with fluid. Assuming that all ports and chambers are filled with fluid and that the pressure to be regulated is exactly at the predetermined desired value, then the valve of FIG. 1 might well be in the position shown in FIG. 1 wherein the land 46 completely covers the ports 45 and the spool 21 has been advanced to a point where there is significant fluid flow between the ports 12 and 13. Under the conditions shown in FIG. 1, the spool 21 partly overlies the ports 27 so that fluid can flow from the main fluid inlet port 12, through the opening 14, into the recess 24, through the ports 26, into the groove 39, through the ports 27, into the recess 25, and finally through the opening 15 out the main fluid outlet port 13. The amount of fluid flow through the valve 10 in this condition is a function of the pressure at the inlet port 12 and of the degree of restriction imposed on the flow from the recess 39 into the ports 27.

With the above operating condition in mind, suppose that the pressure at the port 16 tends to rise. This will force the pressure regulation spool 41 to the left and will permit fluid flow from port 16 through port 45 into recess 36 thereby advancing the fluid flow control spool 21 against the spring 22. This advance in the spool 21 will uncover a larger portion of the ports 27 thereby decreasing the restriction within the flow control portion of the valve 10. As a consequence a larger amount of fluid will flow through the valve 12 from ports 12 to 13, thereby diverting fluid from the line whose pressure is being regulated to and through the valve 10. Thus the pressure in the line will tend to drop back to the desired predetermined pressure with the result that the spool 41 will move to the right to cover the ports 45. In this fashion a small charge of fluid will have been admitted into the chamber 36, the quantity of fluid being admitted into the chamber 36 being just enough to advance the spool 21 the amount required to increase fluid flow through the valve 10 by whatever extent is necessary to maintain the pressure at the ports 12 and 16 constant.

Again, assuming the FIG. 1 static position, if the pressure at the port 16 tends to drop, the spring 43 will push the spool 41 to the right thereby placing the chamber 36 in communication with the low pressure port 17. As a consequence, under the pressure exerted by the spring 22, a small charge of fluid will flow out from the chamber 36, through the port 19, the port 45 and ultimately out the port 17 to the reservoir. This will retract the flow control spool 21 thereby decreasing the amount by which the ports 27 are uncovered. The consequently increased restriction will reduce the amount of fluid being diverted from the line through the valve 10 thereby creating a condition in the line which will tend to increase the pressure at the port 16 of the valve 10.

The plug 42 is adjustable so that the spring 43 may be set at whatever compression is required in order to obtain regulation at a given predetermined pressure level. If it is desired to increase the magnitude of the predetermined control pressure, then the end plug 42 is screwed in to the right in order to increase the bias on the spool 41. Similarly, by screwing the end plug 42 out to the left the bias on the spool 41 is decreased and the pressure that will be maintained at the port 16 in operation will be correspondingly decreased.

To set the valve 10, the technique that may be followed is to tie the ports 12 and 16 to the same point in a hydraulic line and let fluid flow through the valve 10 to port 13. A pressure gage at port 16 can be read while the end plug 42 is adjusted until the gage reads the desired pressure level.

The land 46 has an axial distance that exactly matches the diameter of the port 45 so that considerable precision in the dimensioning of the land 46 and the port 45 is important to obtain precise pressure control through the use of this valve 10. However, once the accurate dimensioning has been achieved, it should be noted that there will be negligible wear on the land 46 and on the ports 45 because there will be no significant flow of fluid over the land 46 or through the ports 45. There is certainly no continuous flow of fluid through this land 46, port 45 valving arrangement, and, what fluid does flow is very limited in amount since all that will normally be required is relatively small adjustments in the spool 21 to compensate for relatively small changes in line pressure. Accordingly, the valve 10 of this arrangement will maintain its accuracy over a long period of time.

From the above description of the operation of this valve 10, it may be seen that the objectives of this invention are achieved. The pressure regulation assembly portion of the valve operates without appreciable flow of fluid. Thus, it is responsive entirely to the pressure at the port 16 (or more specifically, to the differential pressure across the ports 16 and 17). Any change of pressure sufficient to cause the spring 43 to compress or relax will open the ports 45 enough so that a small amount can flow either into the chamber 36 or out of the chamber 36 to make the proper adjustment in the fluid flow control assembly portion of this valve.

SYSTEM ARRANGEMENT

The valve 10 of this invention can be employed in a number of different system arrangements in order (1) to regulate pressure at a point in the system accurately, or (2) to regulate differential pressure across two points in the system, or (3) even to operate as a safety valve to provide an accurate pressure point at which fluid is released through the valve 10, or (4) to operate as a priority valve, or (5) to provide a means for maintaining a constant fluid flow rate through a particular circuit.

FIG. 2 illustrates one system arrangement employing the FIG. 1 valve. FIG. 2 is a hydraulic schematic arrangement in which the hydraulic elements are indicated in block form. The constant pressure valve 10 of FIG. 1 is illustrated with an indication of its five ports 12, 13, 16, 17 and 34 so that the connections between the valve 10 and the rest of the system may be adequately comprehended. In the FIG. 2 system arrangement the first stage inlet port 12 is tied to the second stage port 16 so as to control the pressure at these two ports 12 and 16, indicated as "point A." The point A pressure is the inlet pressure to a hydraulic circuit 70, which hydraulic circuit 70 is supplied by fluid from a reservoir 72 through a pump 74 in the usual fashion. The inlet pressure to the reservoir 72, point B, is zero gage pressure. Since port 17 is tied to point B, the pressure maintained at point A is the setting of the valve 10.

The pressure-flow operating characteristic of the pump 72 is such that at any given output flow rate for the pump 74 there will be one corresponding output pressure. Normally, as output flow increases, output pressure decreases. Thus as the demands of the hydraulic circuit vary and the flow from the pump 72 varies, the output pressure of the pump 72 will vary. However, by virtue of the addition of the constant pressure valve 10 being connected across the hydraulic circuit 70, it becomes possible to create a condition where the output flow rate from the pump 74 is constant as hydraulic circuit 70 demands vary because the difference is taken up or supplied by changes in the flow through the valve 10. Thus by maintaining a constant flow rate for the sum of the flow rate through the hydraulic circuit 70 and through the valve 10, it becomes possible to maintain the pressure at the point A constant. Of course, all of this has to operate within the capacity of the pump 74 and the valve 10. But, assuming that the design has been appropriate, then under normal operating conditions the amount of fluid put out by the pump 74 will be more than enough for any expected demands by the hydraulic circuit 70. The excess fluid is shunted through the valve 10. If hydraulic circuit 70 demand increases, the drop in the pressure at the point A will cause a retraction of the spool 21 in the valve 10 to cut down on the flow of fluid through the valve 10 so that there will be additional fluid available for the hydraulic circuit 70 without requiring additional capacity from the pump 74 and thus without causing the pressure at point A to decrease. Similarly, if the demands of the hydraulic circuit 70 decrease, the tendency for the pressure at point A to increase will open up the valve 10 so that the flow rate of fluid through the valve 10 will increase sufficiently to maintain the output level from the pump 74 constant as to flow rate and pressure.

The port 34 is a venting port in order to prevent the liquid in the chamber 18A from blocking the spool 21. Thus, in FIG. 2 the port 34 is shown connected to the pressure regulation assembly port 17 and also connected to zero gage pressure (that is, the reservoir). The flow control assembly outlet port 13 is also connected to the reservoir and is thus nominally at zero gage pressure. But the port 13 is shown as being brought to the reservoir by means of a separate line. Port 13 is not directly and immediately connected to the port 17 because under flow conditions the pressure at port 13 may not remain constant and it is detrimental to the accurate operation of this valve 10 for the small varying pressures at port 13 to be coupled to the port 17.

FIG. 2 also illustrates the circuit arrangement involved when the valve 10 is employed as a safety pressure relief valve. In such a case, the pump 74 may be presumed to be a pressure compensated variable delivery type of pump which incorporates its own pressure regulator. Assume that the pump 74 setting is at 1,500 p.s.i. Under those conditions, the valve 10 may be set or adjusted to limit the pressure at point A to 1,700 p.s.i. In this circumstance, the valve 10 is operating as a relief valve in order to provide relief when something has gone wrong that causes the pressure at point A to go up to a level that is dangerous for the pump 74. In this type valve 10 operation, when the system is at normal operating conditions and point A is 1,500 p.s.i. the spool 21 may well be bottomed out so that no fluid flows through the ports 12 and 13 of the valve 10. It is only when the pressure at point A rises to the relief pressure of 1,700 p.s.i., that the valve 10 responds by opening to let fluid through the valve 10 so as to keep the pressure at point A down to 1,700 p.s.i. Thus when operated as a pressure relief valve, the valve 10 will not normally pass fluid. This is a safety relief function and the major value of employing the constant pressure valve 10 of this invention in this safety relief valve contex is that a very narrow band of pressure between full flow pressure and reseat pressure may be obtained. The band of pressures around crack pressure may readily be made ±1.0% by employment of the valve of this invention. What this means is that if the crack pressure is 1,700 p.s.i., in keeping with the above example, the full flow pressure will be about 1,715 p.s.i. and the reseat pressure will be around 1,685 p.s.i.

Figure 3:
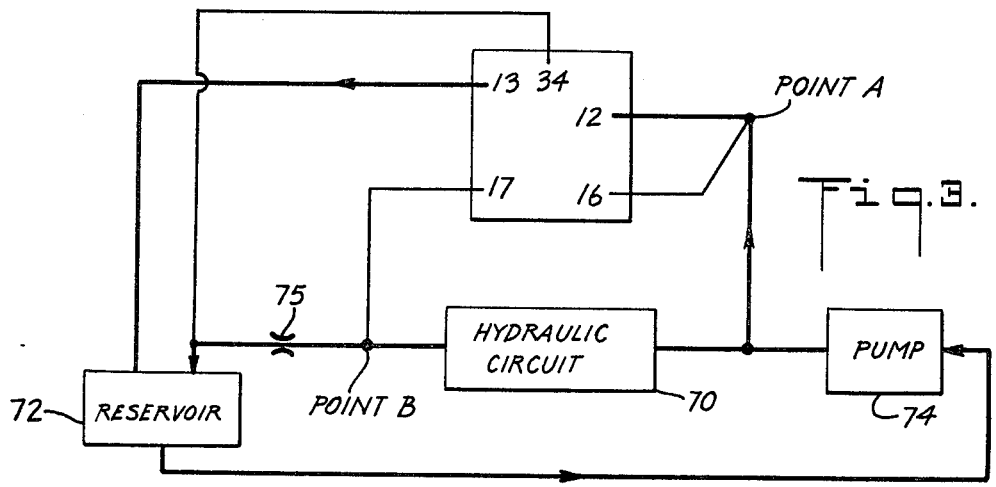
FIG. 3 is a schematic of a hydraulic system in which the FIG. 1 valve is used to regulate the pressure difference between points A and B of the system.

FIG. 3 illustrates the employment of the valve 10 as a differential pressure regulator. In the FIG. 3 system, the hydraulic circuit 70, reservoir 72 and pump 74 operate in substantially the same fashion as they do in FIG. 1 and have the same relationship to one another. Again, as in FIG. 2, the pressure at point A is the input pressure to the hydraulic circuit 70. However, the secondary outlet port 17 is not, in this case, connected to the reservoir 72, but rather to the output point B from the hydraulic circuit 70. As a general matter, point B in FIG. 3 may not be at the zero pressure of the reservoir 72 because of an additional hydraulic circuit or resistance 75. The difference in pressure between points A and B is determined by the setting of the compression spring 43. Otherwise, this FIG. 2 embodiment operates exactly as does the FIG. 1 embodiment and conceptually subsumes the FIG. 2 embodiment as where the hydraulic resistance of the restrictor 72 is zero.

Just as the FIG. 2 circuit arrangement can also be used to describe the employment of the valve 10 as a safety pressure relief valve, so can the FIG. 3 circuit arrangement be used to describe the employment of the valve 10 as a differential safety relief valve. All that this means is that the valve 10 is set so that under normal operating conditions the valve 10 is closed. However, if the pressure difference between points A and B rises above a predetermined magnitude which is determined by the setting of the spring 43, then the valve 10 will open and relieve the pump 74 by by-passing fluid to the reservoir 72.

Figure 4:
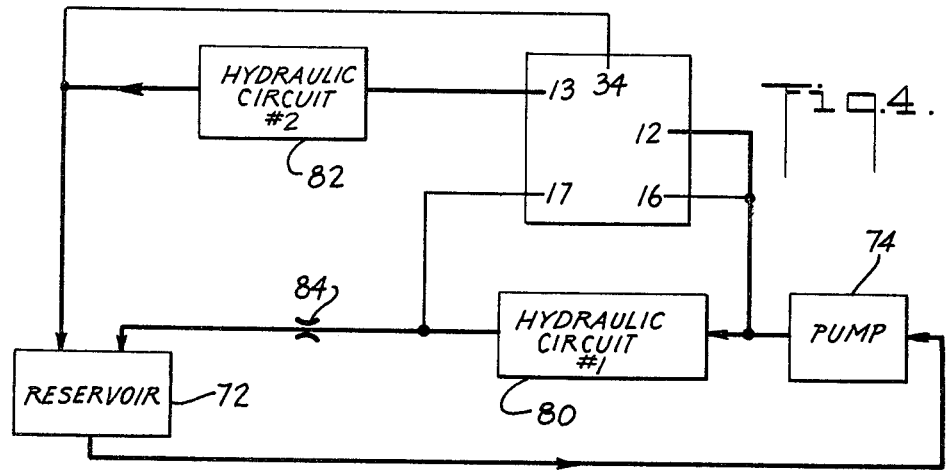
FIG. 4 is a schematic of a hydraulic system in which the FIG. 1 valve is employed as a priority valve to provide the hydraulic circuit No. 1 with priority of demand over hydraulic circuit No. 2.

FIG. 4 is an application of the FIG. 1 constant pressure valve as a priority valve.

The purpose of this priority valve arrangement is to assure that whatever fluid demands are required by the hydraulic circuit 80 are met before there is fluid flow to the hydraulic circuit 82. Generally, this priority arrangement is required because the hydraulic system does not have the capacity to provide the demands of both circuit 80 and 82 at the same time. For example, in an aircraft the operation of the landing gear and the exit doors might well be controlled in such a fashion as to assure that the doors could not open while the landing gear is being lowered. In such a circumstance, the hydraulic circuit 80 (controlling the landing gear) would have to have little or no fluid demand, as for example when the landing gear was positioned so that the aircraft might land in order for the hydraulic circuit 82 (controlling the doors) to obtain any fluid.

The manner in which the FIG. 4 circuit operates can thus be understood by first noting the function and operation of the restrictor 84. When there is substantially no flow through the restrictor 84, then the pressure on both sides of the restrictor 84 will be substantially reservoir pressure. The pressure on the inlet side of the restrictor (that is the output side of the hydraulic circuit 80) will increase as the flow through the restrictor increases.

Otherwise, this priority valve operation has many analogies to the differential pressure relief valve operation of the FIG. 3 system arrangement.

When fluid is flowing through the hydraulic circuit 80 a particular pressure difference is established across the hydraulic circuit 80. The spring 43 in the pressure regulating assembly of the valve 10 is so adjusted that the spool 41 is moved all the way to the right when the pressure differential across the hydraulic circuit 80 has the expected pressure drop during full fluid flow. The bias spring 22 that acts on the spool 21 keeps the spool 21 fully retracted so that the valve 10 is closed as long as the pressure at the port 17 is no greater than the expected hydraulic circuit 80 output pressure during full fluid flow. As the fluid flow through the hydraulic circuit 80 decreases, the pressure at the port 17 (that is, on the upstream side of the restrictor 84) will drop toward reservoir pressure due to decreased drop across the restrictor 84. As a consequence the differential pressure across the port 16 and 17 will increase. At a predetermined pressure differential, the spool 41 will be forced to the left until the land 46 moves to the left of the port 45 thereby permitting fluid at pump pressure from the port 16 to enter the chamber 36 thereby advancing flow control spool 21. This will couple the ports 12 and 13 thereby permitting fluid flow through the ports 12 and 13 to and through the hydraulic circuit 82. In this fashion, hydraulic circuit 80 is given demand priority over hydraulic circuit 82 in that the hydraulic circuit 82 cannot bleed fluid from the hydraulic circuit 80 as long as the hydraulic circuit 80 is in substantial operation.

Figure 5:
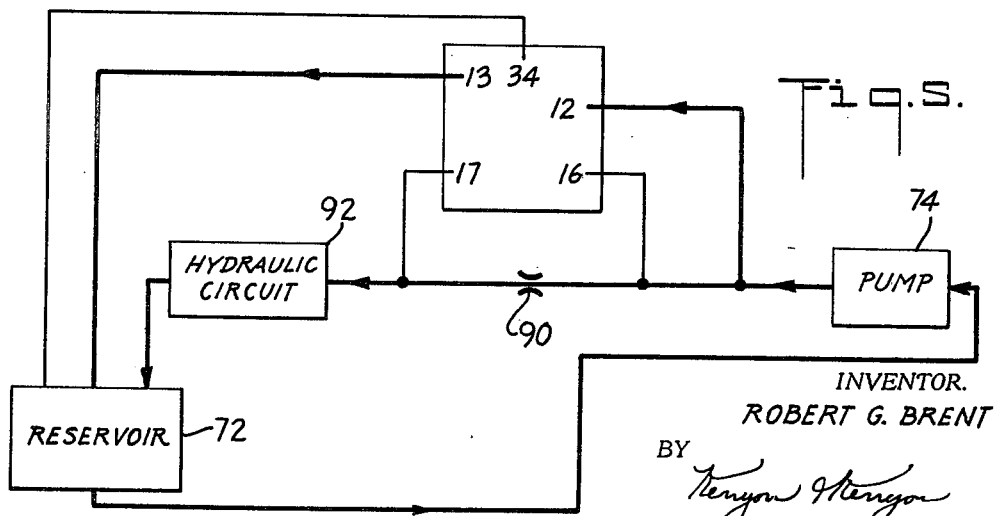
FIG. 5 is a schematic of a hydraulic system in which the FIG. 1 valve is employed to assure a constant flow rate of fluid to the operative hydraulic circuit.

FIG. 5 illustrates a particularly useful system function of the constant pressure valve 10 of this invention. Because the valve 10 can be employed to control a pressure differential very accurately, this valve can be used to control the pressure across an orifice 90 accurately and thereby accurately control the flow through the orifice 90. The flow through a given orifice 90 is a strict function of the pressure across that orifice, and thus by controlling the pressure across the orifice 90 the fluid flow through the orifice 90 can be made constant. As a consequence, fluid flow through the hydraulic circuit 92 can be kept constant.

In operation, a change in the pressure output from the pump 74 is reflected as a change in pressure in the port 16. If this pressure goes up, the pressure regulating spool 41 will move to the left and the flow control spool 21 will advance thereby increasing the opening between the main fluid ports 12 and 13 and increasing the fluid flow through the valve 10 with the result that the output pressure from the pump will drop back to the controlled pressure. If the pressure from the pump tends to go below the controlled pressure quite the opposite will happen and the drop in pressure at the port 16 will result in the pressure regulating spool 41 moving to the right so that the flow control spool 21 will retract thereby increasing the restriction between the ports 12 and 13 with the result that less fluid will flow through the valve 10. Consequently, the output pressure of the pump will tend to increase and thus stay at the regulated pressure level.

If for any reason, the pressure on the downstream side of the orifice 90 (that is, on the input side of the hydraulic circuit 92) varies the pressure regulating port 17 will respond to such change in pressure in a comparible fashion to cause the pressure drop across the orifice 90 to remain constant. In any case, as long as the pressure drop across the orifice 90 is thus kept constant, the flow of fluid through the orifice 90 will remain constant and thus the flow of fluid through the hydraulic circuit 92 will remain constant.

A very specific embodiment of the valve of this invention has been illustrated and described. In addition, various systems incorporating the valve of this invention have been described. However, it should be understood that many variations of the valve embodiment shown could be made without departing from the scope of this invention. The systems described represent the uses that it is contemplated will be most frequently encountered. But other applications for this valve can be contemplated. For example, the ports 17 and/or 34 could be tied to inputs which would modulate the current flow through the valve 10 and thus modulate or modify the pressure being regulated.

What I cliam is:
1. A pressure regulating valve comprising:
 (A) a fluid flow control assembly including:
  (1) a housing having an inlet port and an outlet port,
  (2) means including a restriction to provide communication between said inlet port and said outlet port, and
  (3) continuously variable first control regulation means for varying the restriction between said inlet and said outlet ports, said continuously variable first control means including a pressure surface, and
 (B) a pressure regulation assembly including:
  (1) a housing having a first main port, a second main port and an intermediate port, and
  (2) second control means responsive to the pressure difference across said main ports to place said pressure regulation assembly in one of three states, (i) a first state wherein said second control means, being responsive to a predetermined pressure difference across said main ports, cuts off communication between said intermediate port and either of said main ports, (ii) a second state wherein said second control means, being responsive to an increase above said predetermined pressure difference across said main ports, places said intermediate port in communication solely with said first main port, and (iii) a third state wherein said second control means, being responsive to a decrease below said predetermined pressure difference across said main ports, places said intermediate port in communication solely with said second main port,
 (C) said intermediate port of said pressure regulation assembly being in communication with said pressure surface of said flow control regulation means to position said continuously variable flow control regulation means as a function of the quantity and direction of fluid flow through said intermediate port, and said pressure surface of said first control regulation means being isolated from fluid flowing from said inlet port to said outlet port.

2. The pressure regulating valve of claim 1 wherein said second control means comprises a spool having a land with an axial dimension equal to the diameter of said intermediate port and disposed adjacent to said port to provide a land-port valving relationship between said intermediate port and said spool.

3. The pressure regulating valve of claim 2 wherein said spool is spring biased in a direction tending to a position that places said valve in said third state.

4. The pressure regulating valve of claim 1 wherein said first control means comprises: a spool mounted for axial movement in a chamber within said housing, said spool having a land positioned to provide a land-port valving relationship with at least one of said inlet or outlet ports, one end of said spool and said housing constituting a chamber in communication with said intermediate port of said pressure regulation assembly, whereby the amount of fluid in said chamber will determine the position of said spool and thus the extent of opening provided by said land-port valving arrangement.

5. The pressure regulating valve of claim 4 wherein said spool is spring biased in a direction tending to a closed position in which said land completely blocks at least one of said inlet or outlet ports and said one end of said spool defining the said pressure surface.

6. The pressure regulating valve of claim 1 wherein: said first control means comprises a first spool mounted for axial movement in a chamber within said housing, said first spool having a first land positioned to provide a first land-port valving relationship with at least one of said inlet or outlet ports, one end of said first spool and said housing constituting a chamber in communication with said intermediate port of said pressure regulation assembly, whereby the amount of fluid in said chamber will determine the position of said first spool and thus the extent of opening provided by said first land-port valving arrangement, and said second control means comprises a second spool having a second land with an axial dimension equal to the diameter of said intermediate port and disposed adjacent to said port to provide a second land-port valving relationship between said intermediate port and said spool.

7. The pressure regulating valve of claim 6 wherein said first spool is biased in a direction tending to a closed position in which said first land completely blocks at least one of said inlet or outlet ports and wherein said second spool is spring biased in a direction tending to a position that places said valve in said third state.

References Cited

UNITED STATES PATENTS

| | | | |
|---|---|---|---|
| 2,320,445 | 1/1943 | Martin | 137—492.5 XR |
| 2,404,102 | 7/1946 | Schultz | 137—492.5 XR |
| 2,697,445 | 12/1954 | Cowles | 137—492.5 |
| 2,745,429 | 5/1956 | Crookstone | 137—492.5 |
| 3,095,897 | 7/1963 | Pennstrom | 137—492.5 XR |
| 3,136,328 | 6/1964 | Hipp | 137—117 |
| 3,229,717 | 1/1966 | Rice | 137—117 XR |

M. CARY NELSON, Primary Examiner

R. J. MILLER, Assistant Examiner